P. DIETZ.
FOCUSING DEVICE FOR PHOTOGRAPHIC CAMERAS.
APPLICATION FILED NOV. 11, 1915.
1,239,469.
Patented Sept. 11, 1917.
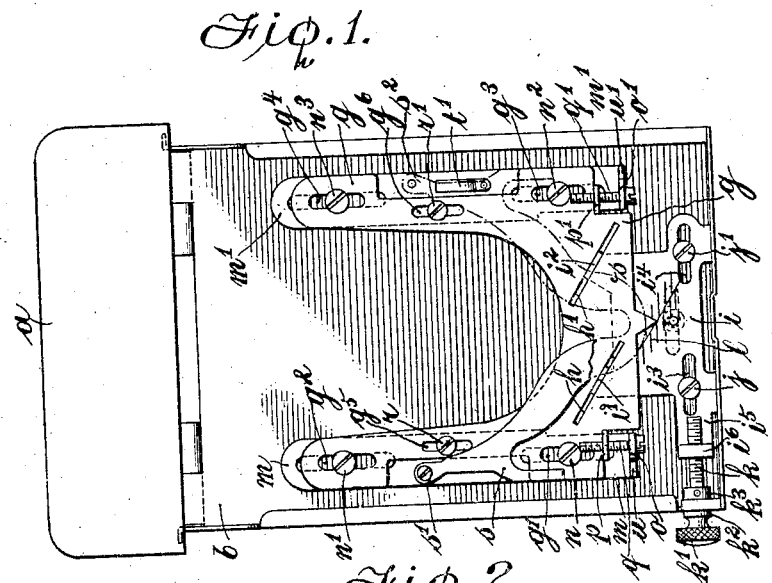
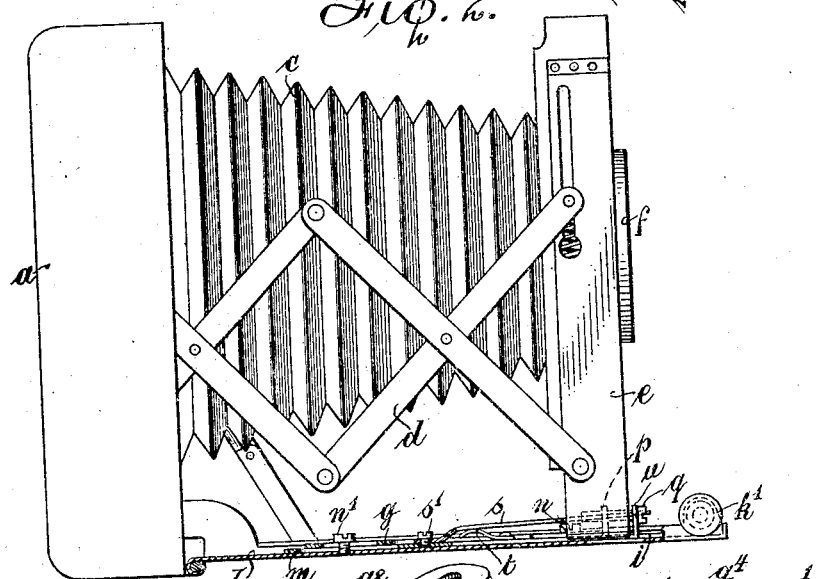
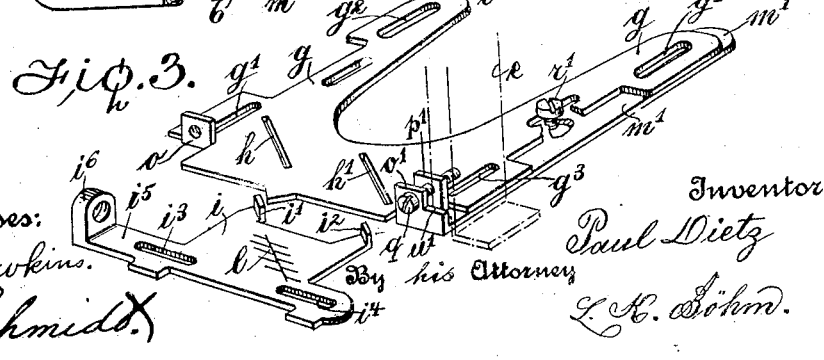
Witnesses:
Wm. H. Hawkins.
L. C. Schmidt.
Inventor
Paul Dietz
By his Attorney
L. K. Böhm.

UNITED STATES PATENT OFFICE.

PAUL DIETZ, OF PHILADELPHIA, PENNSYLVANIA, ASSIGNOR TO DEFIANCE MANUFACTURING COMPANY, OF PHILADELPHIA, PENNSYLVANIA, A CORPORATION OF PENNSYLVANIA.

FOCUSING DEVICE FOR PHOTOGRAPHIC CAMERAS.

1,239,469.     Specification of Letters Patent.     Patented Sept. 11, 1917.

Application filed November 11, 1915. Serial No. 60,834.

*To all whom it may concern:*

Be it known that I, PAUL DIETZ, a citizen of the Empire of Germany, and a resident of Philadelphia, county of Philadelphia, State of Pennsylvania, have invented certain new and useful Improvements in Focusing Devices for Photographic Cameras, of which the following is a specification.

This invention has reference to a novel focusing-device for photographic cameras and has for its special purpose to produce a device, for the adjustment of the focusing-point, which occupies very little space within the camera.

An essential feature of the present invention resides in the form of the device for the adjustment of the focusing-point from the resting point of or from the infinite position to near objects, and its simple operation. This has been primarily attained by constructing the device essentially of several thin slotted metal plates which are provided inside on the door of the camera. The focusing-device comprises a focus plate and two adjusting plates which may be connected to form one plate and mounted underneath or on the focus plate. The relative position of the adjusting plates and the focus plate is adjusted and permanently fixed at the factory. The focusing-device is set or adjusted by the operator by means of a movable adjusting plate engaged by a screw which remains in a permanent location outside of the camera while the movement of the operative mechanism is effected inside. The screw engages a nut forming part of the movable adjusting plate having slots to permit of a lateral movement and one or two inner end lugs bent at a right angle relative to the body of the plate but in a slanting direction to engage one or two corresponding laterally inclined slots of the focus plate. In this manner a forward and rearward motion of the focus plate is effected whereby the focus of the lenses in the camera may be changed from the infinite position to near objects. As the adjusting plates set at the factory are locked to the focus plate these move along while thus in their adjusted, permanently fixed position. This renders it possible to employ a movable adjusting plate with a scale thereon applied previous to assembling the device.

In order to render the invention entirely clear reference is had to the accompanying drawing in which:

Figure 1 represents a camera with open door showing the novel focusing-device in plan view.

Fig. 2 shows the camera in side elevation with the door and certain parts in section.

Fig. 3 illustrates the focusing-device detached, in perspective views.

Similar characters of reference denote like parts in all the figures.

In the drawing a focusing-device is shown for example in which $a$ represents the camera casing, $b$ is the door, $c$ the bellows and $d$ the tong mechanism which is secured with its outer ends to the lens board $e$. The lens board carries the tube $f$ which houses the lenses.

The novel focusing-device comprises a focus plate $g$ substantially of the form shown in Figs. 1 and 3. The focus plate is located on the inner front of the door of the camera and is shown in Figs. 1 and 3 to be provided with two laterally inclined slots $h$, $h^1$. A special adjusting plate $i$, shown in plan view in Fig. 1 and in perspective view in Fig. 3 is provided at the free end portion of the door. This plate $i$ has on its inner end two lugs $i^1$, $i^2$, which are bent under a right angle relative to the body portion of the plate but in a slanting or laterally inclined position. The lugs $i^1$, $i^2$, reach from below into the slots $h$, $h^1$, of the focus plate which are cut under a corresponding, inclined or slanting angle and the lugs are adapted to perform, in the said slots, a parallel movement relative to said focus plate. The adjusting plate $i$ has two slots $i^3$, $i^4$, parallel to its outer longitudinal edge. Through the slot $i^3$ passes a screw $j$ into the door and through the slot $i^4$ a like screw $j^1$ also passes into the door so arranged that the plate can perform a lateral movement on said screws along the slots.

The adjusting plate $i$ has a lateral extension $i^5$ shown to the left in Figs. 1 and 3. At the end of this extension a nut $i^6$ is formed into which reaches the threaded shank $k$ of a screw extending through the wall of the camera casing and having its head $k^1$ outside of the casing. The outer portion of the shank $k$ has a flange $k^2$ which rests against the outer surface of the side wall of the casing and therefore the adjoining screw head $k^1$ always retains a permanent position. The threaded shank of the screw, however, passes through the nut $i^6$ of the adjusting plate $i$ and imparts motion to said plate within the camera. This motion is transferred, by means of the lugs $i^1$, $i^2$, of the adjusting plate $i$ to the focus plate $g$. To properly guide the shank $k$ of the screw a bushing $k^3$ is mounted thereon resting against the inner wall of the camera casing. The plate $i$ is provided with a scale $l$. The description herein given renders it clear that the focus plate may be moved in by the operator by turning the screw head $k^1$ in one direction and moved out by turning it in the opposite direction. By means of suitable connections this movement is transferred to the lens board whereby the focusing-point is adjusted.

The focus plate $g$ further has four slots $g^1$, $g^2$, $g^3$, $g^4$, parallel to the focusing direction. In connection with the focus plate there are two thin adjusting plates or strips $m$, $m^1$, which may be mounted underneath or above the same. In the drawing these adjusting plates are shown to be underneath the focus plate. The adjusting plates $m$, $m^1$ have slots corresponding to and coinciding with the four slots in the focus plate. Screws $n$, $n^1$, $n^2$, $n^3$, pass one each through these slots into the door. Thus both plates may be moved in and out on those guiding screws and slots. To adjust the distance between the focus plate $g$ and the adjusting plates $m$, $m^1$ both plates are provided with bearings $o$, $o^1$, $p$, $p^1$, through which adjusting screws $q$, $q^1$ pass which are set at the factory. As soon as the distance between the focus plate and the adjusting plates has been set both are permanently secured together by means of screws $r$, $r^1$, passing through threaded slots $g^5$, $g^6$, of the focus plate down upon the plate $m^1$, as shown in detail in Fig. 3 relative to the screw $r^1$. This adjustment of the distance between the focus plate and the two adjusting plates $m$, $m^1$, renders it possible to engrave or stamp the scale $l$ on the special adjusting plate $i$ directly at the works before the focusing-device is assembled which is of practical advantage.

When the door of the camera has been let down and the bellows, tong device and lens board occupy the position indicated in Fig. 2 these parts are locked in this position by a spring stop $s$ secured by screws $s^1$, $s^2$ at the inner ends and normally kept with its outer portion in the raised position by leaf springs $t$, $t^1$, which operate in known manner. The camera thus is held in a fixed position until the spring is released and thereby the lens board. During the adjustment of the focusing-device by the operator to find the proper range the spring stop certainly moves with the other parts of the focusing-device. Adjoining the bearings $o$, $o^1$ of the adjusting plates $m$, $m^1$, there are formed stops $u$, $u^1$ for the lens board $e$. Thus the focusing-device, made of thin metal plates occupies very little space on the door of the camera and contains all movable mechanism within the camera having outside solely a screw head to be turned by the operator which screw head is in a permanent position.

I claim as my invention:

1. A thin focusing-device mounted on the inner surface of the door of a photographic camera, comprising a focus plate, adjusting means secured to the focus plate in an adjusted permanently fixed position, a movable adjusting plate with inner portion engaging the focus plate, and means for moving the focusing device comprising a screw with head in a permanent position outside of the camera adapted to move the said adjusting plate and thereby the focusing-device in and out, thus adjusting the focus.

2. A thin focusing-device on the inner surface of the door of a photographic camera, comprising a focus plate with slantingly inclined slots, a movable adjusting plate with inner portion having rectangular inclined lugs thereon reaching into the inclined slots of the focus plate, two adjusting plates underneath the side portions of the focus plate secured thereto in an adjusted permanently fixed position, and a screw having its head outside of the camera in a permanent position adapted to move the adjusting plate with its lugs and thereby the focusing-device in and out, thus adjusting the focus.

3. In a photographic camera a focusing-device on the inner surface of the door comprising a focus plate with slantingly inclined slots and guide slots, two adjusting plates underneath the side portions of the focus plate with corresponding guide slots, bearings on the plates, screws therein to adjust the relative position of said plates, a tightening device for said plates, and means to move said plates in and out to adjust the focus.

4. In a photographic camera a focusing-device on the inner surface of the door comprising a focus plate with slantingly inclined slots in its body portion, a movable adjusting plate with inner portion having rectangular inclined lugs reaching into the inclined slots, guide slots with screws in said movable plate, a bearing formed thereon, a screw in the bearing with a head outside of the camera in a permanent position adapted to impart to said plate lateral movement whereby its lugs travel in the inclined slots of the focus plate moving the same in and out for adjusting the focus.

5. In a photographic camera with adjustable lens board, a thin focusing-device on the inner surface of the door comprising a focus plate with two adjusting plates, means for securing the same on the focus plate in an adjusted permanently fixed position, a movable adjusting plate engaging the focus plate to move it in and out for adjusting the focus, and stops on said permanently fixed adjusting plates to keep the lens board in position, and a spring stop with leaf springs to lock the lens board in position until released.

6. In a photographic camera a focusing-device for adjusting the focus comprising a focus plate with two adjusting plates, means for securing the same on the focus plate in an adjusted permanently fixed position, and a movable adjusting plate with a scale thereon engaging and moving the focus plate, and means for moving the focus plate in and out.

Signed at Philadelphia, Pa., this ninth day of November, 1915.

PAUL DIETZ.

Witnesses:
WALTER E. COTTON,
JOHN MARX.

Copies of this patent may be obtained for five cents each, by addressing the "Commissioner of Patents, Washington, D. C."